(12) United States Patent
Sun et al.

(10) Patent No.: US 12,049,138 B2
(45) Date of Patent: Jul. 30, 2024

(54) ACTIVE TRACTION MOTOR HARMONIC MASKING USING RANDOM SWITCHING FREQUENCY PROCESS

(71) Applicant: Ford Global Technologies, LLC, Dearborn, MI (US)

(72) Inventors: Xuemei Sun, Canton, MI (US); Donald Albert Bradley, Pleasant Ridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 17/840,196

(22) Filed: Jun. 14, 2022

(65) Prior Publication Data

US 2023/0398879 A1    Dec. 14, 2023

(51) Int. Cl.
*B60L 15/20*        (2006.01)
*H02P 27/08*        (2006.01)

(52) U.S. Cl.
CPC .............. *B60L 15/20* (2013.01); *H02P 27/08* (2013.01); *B60L 2240/42* (2013.01)

(58) Field of Classification Search
CPC ...... B60K 17/12; H02P 27/08; H02P 23/0077; H02P 23/04; H02P 6/28; B60L 53/24; B60L 50/51; B60L 53/14
See application file for complete search history.

(56) References Cited

U.S. PATENT DOCUMENTS

| | | | |
|---|---|---|---|
| 7,024,871 | B2 | 4/2006 | Zhu et al. |
| 10,193,489 | B2 | 1/2019 | Son et al. |
| 10,319,360 | B1 | 6/2019 | He et al. |
| 11,257,477 | B2 | 2/2022 | Gomez et al. |
| 2018/0154786 | A1* | 6/2018 | Wang ............... B60L 53/24 |

\* cited by examiner

*Primary Examiner* — Said Bouziane
(74) *Attorney, Agent, or Firm* — David R. Kelley; Brooks Kushman P.C.

(57) ABSTRACT

An automotive control system includes a controller for use with an inverter configured to drive a traction motor with electrical energy from a traction battery. The controller is programmed to select a base switching frequency for a control signal for the inverter such that a switching noise sideband frequency of the inverter is the same as a harmonic frequency of the traction motor, modify the selected base switching frequency by a random switching frequency to obtain a modified switching frequency, and control the inverter with the control signal having the modified switching frequency for the inverter to drive the traction motor.

19 Claims, 4 Drawing Sheets

ACTIVE TRACTION MOTOR HARMONIC MASKING USING RANDOM SWITCHING FREQUENCY PROCESS

TECHNICAL FIELD

The present invention relates to methods and systems for masking acoustic noise emitted by a traction motor of an electrified vehicle.

BACKGROUND

An electrified vehicle (EV) includes a traction powertrain having a traction battery, a power electronics module such as an inverter, and a traction motor. The traction motor may be powered with electrical energy from the traction battery via the inverter to propel the EV. Power switches of the inverter are controlled to switch on and off for the appropriate electrical energy to be provided to the traction motor. The traction motor and the inverter operating in propelling the EV may emit tonal acoustic noise.

SUMMARY

A system having a traction motor, an inverter, and a controller is provided. The inverter is configured to drive the traction motor with electrical energy from a traction battery. The controller is programmed to select a base switching frequency for a control signal for the inverter such that a switching noise sideband frequency of the inverter is the same as a harmonic frequency of the traction motor. The controller is further programmed to modify the selected base switching frequency by a random switching frequency to obtain a modified switching frequency. The controller is further programmed to control the inverter with the control signal having the modified switching frequency for the inverter to drive the motor.

The controller may be further configured to select the base switching frequency by equating an expression representing the switching noise sideband frequency of the inverter with an expression representing the harmonic frequency of the traction motor.

The control signal may be a pulse-width-modulated (PWM) control signal.

The inverter may include power switches which switch on-and-off according to the modified switching frequency of the PWM control signal for the inverter to be controlled with the control signal.

The random switching frequency may vary over time whereby the modified switching frequency of the control signal varies correspondingly.

The random switching frequency may fall within a predetermined random switching frequency range which depends on a value of the harmonic frequency. The predetermined random switching frequency range may be a range of ± the value of the harmonic frequency or a proper fraction thereof.

A method includes selecting a base switching frequency for a control signal of a power electronics module such that a switching noise sideband frequency of the power electronics module is the same as a harmonic frequency of a motor. The method further includes modifying the selected base switching frequency by a random switching frequency to obtain a modified switching frequency. The method further includes controlling the power electronics module with the control signal having the modified switching frequency for the power electronics module to drive the motor.

An automotive control system for use with an inverter configured to drive a traction motor with electrical energy from a traction battery is also provided. The automotive control system includes a controller programmed to select a base switching frequency for a control signal for the inverter such that a switching noise sideband frequency of the inverter is the same as a harmonic frequency of the traction motor. The controller is further programmed to modify the selected base switching frequency by a random switching frequency to obtain a modified switching frequency. The controller is further programmed to control the inverter with the control signal having the modified switching frequency for the inverter to drive the traction motor.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
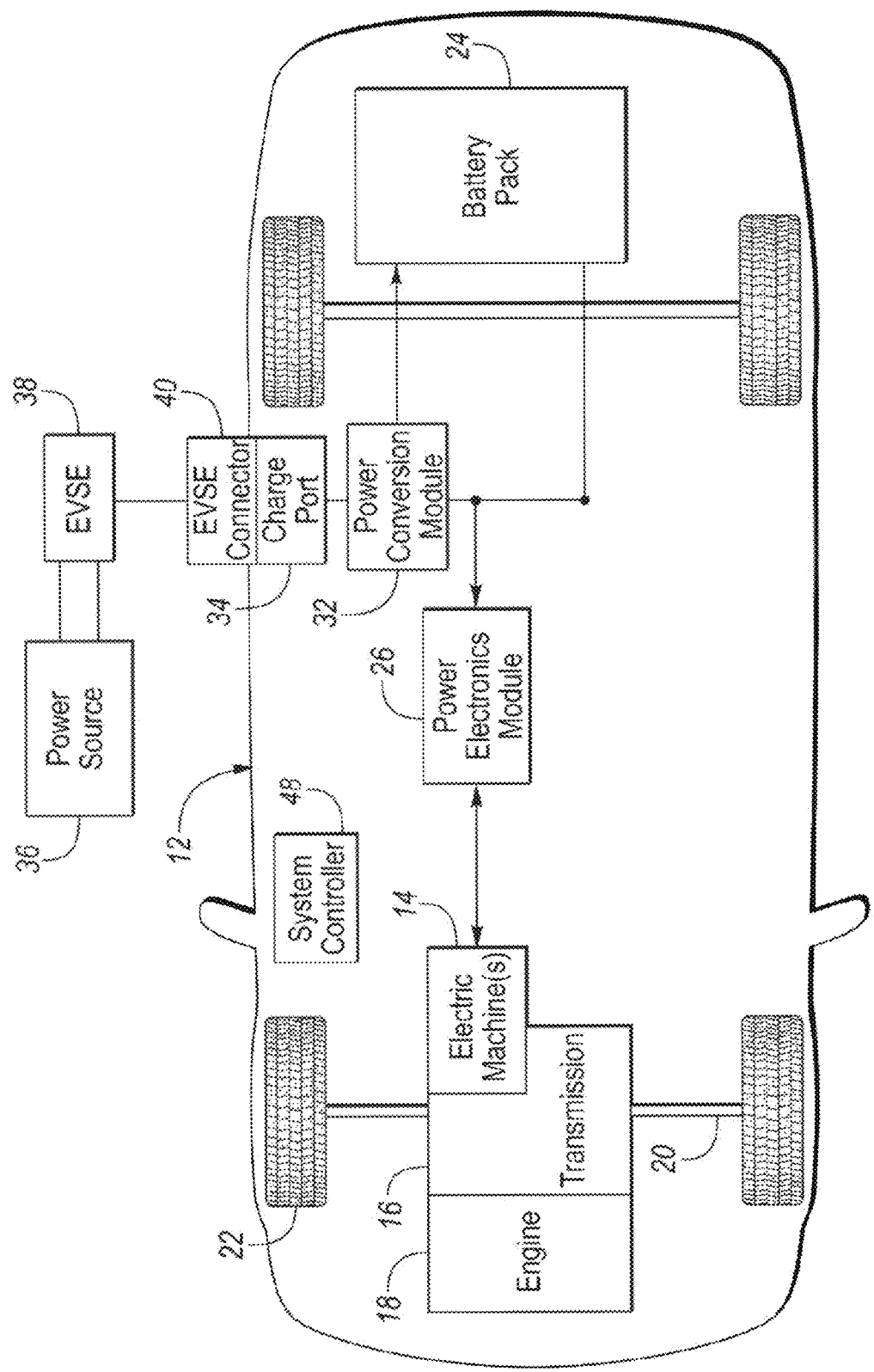
FIG. 1 illustrates a block diagram of an electrified vehicle (EV) having a traction powertrain including a traction battery, a power electronics module such as an inverter, and a traction motor.

Referring now to FIG. 1, a block diagram of an exemplary electrified vehicle (EV) 12 is shown. EV 12 includes a traction powertrain including a traction battery (or "battery pack") 24, a power electronics module 26 such as an inverter, and one or more traction motors (or "electric machines") 14. In this example, EV 12 is a hybrid electric vehicle (HEV) further having an engine 18. In other embodiments, EV 12 is battery-only electric vehicle (BEV). In a BEV configuration, EV 12 does not include engine 18.

Traction motor 14 is part of the traction powertrain of EV 12 for powering movement of the EV (i.e., traction motor 14 is operable to provide propulsion capability to EV 12). In this regard, traction motor 14 is mechanically connected to a transmission 16 of EV 12. Transmission 16 is mechanically connected to a drive shaft 20 that is mechanically connected to wheels 22 of EV 12. Engine 18 is also mechanically connected to transmission 16 to provide propulsion capability to EV 12.

Traction motor 14 can provide propulsion capability to EV 12 while engine 18 is turned on or off. Traction motor 14 is also capable of operating as a generator. Traction motor 14 acting as a generator can recover energy that may normally be lost as heat in a friction braking system of EV 12.

Traction battery 24 stores electrical energy that can be used by traction motor 14 for propelling EV 12. Traction battery 24 typically provides a high-voltage (HV) direct current (DC) output. Traction battery 24 is electrically connected to inverter (or "power electronics module") 26. Traction motor 14 is also electrically connected to inverter 26. Inverter 26 provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

In this example, EV 12 is a plug-in HEV (PHEV). As such, traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32 of EV 12 may condition power supplied from EVSE 38 to provide the proper voltage and current levels to traction battery 24. Power conversion module 32 may interface with EVSE 38 to coordinate the delivery of power to traction battery 24. Alternatively, various components described as being electrically connected may transfer power using a wireless inductive coupling.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating EV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Figure 2:
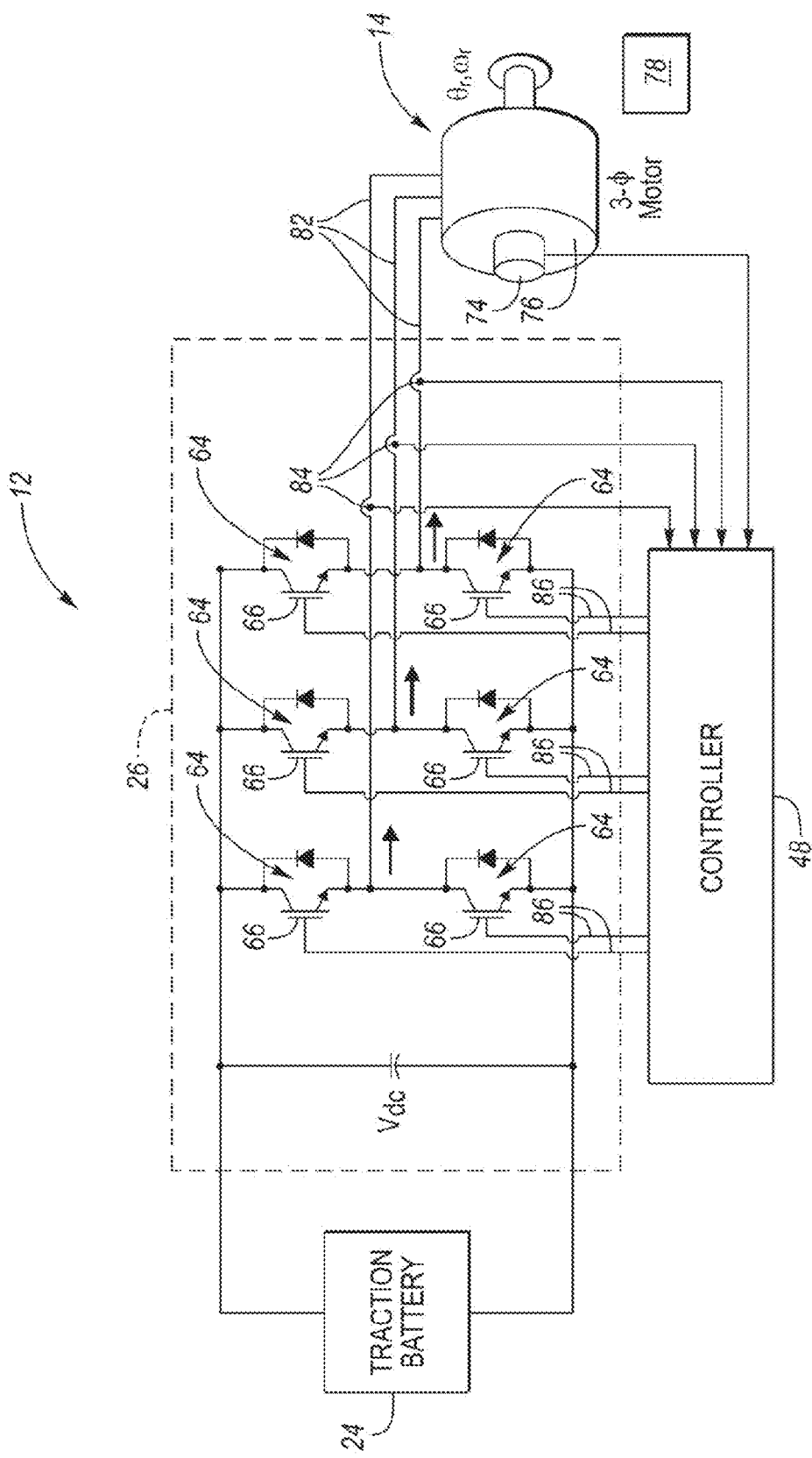
FIG. 2 illustrates a functional diagram of the traction battery, the inverter, and the traction motor of the traction powertrain of the EV.

Referring now to FIG. 2, with continual reference to FIG. 1, a functional diagram of traction battery 24, inverter 26, and traction motor 14 of the traction powertrain of EV 12 is shown. As noted above, inverter 26 is coupled between traction battery 24 and traction motor 14. Inverter 26 converts DC electrical power provided from traction battery 24 into AC electrical power for providing to traction motor 14. In this way, inverter 26 drives traction motor 14 with power from traction battery 24 for the traction motor to propel EV 12. A DC-link capacitor connected in parallel with traction battery 24 is ordinarily disposed between the traction battery and inverter 26.

Inverter 26 shown in FIG. 2 is an exemplary inverter. As known to those of ordinary skill in the art, inverters convert DC power to single or multi-phase AC power (three-phase AC power being most common and is illustrated in FIG. 2). Controller 48 is operable to control inverter 26 for the inverter to move electrical power from traction battery 24 for driving (i.e., motoring) traction motor 14. Particularly, controller 48 controls power switches 66 of inverter 26 to open and close (e.g., switch on and off) pursuant to a selected switching frequency and a selected duty cycle for inverter 26 to move electrical power from fraction battery 24 to fraction motor 14.

In the exemplary example, inverter 26 includes three sets of pairs of power switching units 64 (i.e., three×two=a total of six power switching units 64 as shown in FIG. 2). Each set of power switching units 64 includes two power switches 66 connected in series. In this example, each power switch 66 is a transistor in the form of an insulated gate bipolar transistor (IGBT).

Each set pair of power switching units 64 is connected in parallel to fraction battery 24 and thereby each set pair of power switching units forms a "phase" of inverter 26. Power switches 66 of each of the three phases of inverter 26 are electrically connected to fraction motor 14 via three power conductors 82, respectively. Current sensors 84 may be disposed to monitor electrical current in power conductors 82. In this way, inverter 26, having three set pairs of power switching units 64, is a three-phase inverter operable for converting DC electrical power from fraction battery 24 into three-phase AC electrical power for providing to fraction motor 14.

Traction motor 14 shown in FIG. 2 is an exemplary traction motor. In this example, fraction motor 14 is configured as a three-phase permanent magnet device that includes a rotor 74 disposed in a stator 76. Position sensors 78 may be used to monitor rotational position $\Theta_r$ and rotational speed $\omega_r$ of rotor 74.

As indicated, controller 48 is operable to control the on-and-off switching operation of power switches 66 to cause inverter 26 to convert a given DC electrical power provided from traction battery 24 into a desired AC electrical power for providing to traction motor 14. In operation, controller 48 receives motor control commands and controls states of inverter 26 to provide motor drive functionalities. Controller 48 monitors signal inputs from position sensor 78 and from power conductors 82. Controller 48 communicates control signals via control lines 86 to individual ones of power switches 66 of inverter 26. Controller 48 includes control circuits, algorithms, and other control elements to generate the control signals. Power switches 66 control the phase currents $i_a$, $i_b$, and $i_c$, which are transferred via power conductors 82 to traction motor 14 to generate power in the form of torque and/or rotational speed based upon the motor position $\Theta_r$ and/or the motor speed $\omega_r$.

In controlling inverter 26 to drive traction motor 14 with the desired AC electrical power, controller 48 controls the operation of power switches 66 according to pulse-width-modulated (PWM) control strategies. In this regard, controller 48 generates a PWM control signal having a selected carrier switching frequency and a selected duty cycle. Power switches 66 in response to PWM control signals switch on and off according to the switching frequency and the duty cycle of the PWM control signals. Traction motor 14 is correspondingly driven pursuant to the operation of power switches 66 such as to thereby propel EV 12.

In accordance with the present disclosure, controller 48 implements PWM control signals in a manner that masks unwanted tonal acoustic noise emitted by traction motor 14 and inverter 26 during operation such as in propelling EV 12. The tonal acoustic noise includes harmonic noise of traction motor 14 and switching noise of inverter 26.

In order to mask the unwanted tonal acoustic noise, controller 48 provides active masking of traction motor harmonics using a random switching frequency process to reduce the tonal acoustic noise. In operation, initially, controller 48 selects the carrier switching frequency for a PWM control signal at which a switching noise sideband frequency of inverter 26 is the same as (i.e., at least approximately equal to) a harmonic frequency of a selected harmonic of traction motor 14. Thereafter, controller 48 adds or subtracts a random switching frequency to or from the selected PWM carrier switching frequency in generating the PWM control signal for use in controlling inverter 26.

The random switching frequency may fall within a predetermined frequency range. The random switching frequency range may depend on the value of the selected motor harmonic frequency. Particularly, the largest frequency in the predetermined random switching frequency may be less than or equal to the selected motor harmonic frequency. For instance, when the selected motor harmonic frequency is 3500 Hz, the random switching frequency range may be at most ±3500 Hz. In other embodiments, the random switching frequency range is a proper fraction of the value of the selected motor harmonic frequency. For instance, in this case with the proper fraction being 2/7 and the selected motor harmonic frequency being 3500 Hz, the random switching frequency range is ±1000 Hz.

The random switching frequency randomly changes over time within its predetermined random switching frequency range. For instance, with the random switching frequency range being ±1000 Hz, the random switching frequency may be +857 Hz at a first time instant (the "+" meaning to add 857 Hz to the selected PWM carrier switching frequency), +248 Hz at a second time instant, −175 Hz at a third time instant (the "−" meaning to subtract 175 Hz from the selected PWM carrier switching frequency), +76 Hz at a fourth time instant, etc.

The result is that controller 48 generates a PWM control signal having a modified carrier switching frequency, wherein the modified carrier switching frequency=the carrier switching frequency at which a switching noise sideband frequency of inverter 26 matches the harmonic frequency of the selected harmonic of the traction motor ± the random switching frequency, wherein the random switching frequency randomly changes over time within a predetermined random switching frequency range.

As an example, the harmonic frequency of a selected harmonic of a four-pole traction motor 14 is 4700 Hz at 6000 rpm mechanical speed. Consequently, controller 48 selects the carrier switching frequency for a PWM control signal at which a switching noise sideband frequency of inverter 26 is also 4700 Hz. Put another way, controller 48 selects a particular PWM control signal carrier switching frequency such that a switching noise sideband frequency of inverter 26 is the same as the harmonic frequency of the selected harmonic of the traction motor. The operation employed by controller 48, in accordance with the present disclosure, in selecting this particular carrier switching frequency is described in greater detail below.

As an example, the selected carrier switching frequency is 3500 Hz. Further, as an example, the random switching frequency is +400 Hz at a first time instant. Consequently, controller 48 adds 400 Hz to the selected 3500 Hz carrier switching frequency to obtain the modified carrier switching frequency of 3900 Hz. As a result, controller 48 generates at the first time instant the PWM control signal with a 3900 Hz carrier switching frequency. Subsequently, at a succeeding second time instant, as an example, the random switching frequency is −300 Hz. Consequently, controller 48 subtracts 300 Hz from the selected 3500 Hz carrier switching frequency to obtain the modified carrier switching frequency of 3200 Hz. As a result, controller 48 generates at the second time instant the PWM control signal with a 3200 Hz carrier switching frequency.

Controller 48 implements the PWM control signal with the modified carrier switching frequency in controlling power switches 66 of inverter 26. Again, the modified carrier switching frequency is the carrier switching frequency at which a switching noise sideband frequency matches the harmonic frequency, and thereafter adjusted by the random switching frequency.

As a result of the use of the PWM control signal with the modified carrier switching frequency in controlling inverter 26 to drive traction motor 14, the harmonic noise of the traction motor and the switching noise of the inverter are smeared out. That is, using the PWM control signal with the modified carrier switching frequency in controlling inverter 26 causes random switching noise to be added onto the traction motor harmonics to thereby reduce high pitch motor harmonic tonal noise by enriching sound frequencies and raising the noise floor. This operation can be used in the speed range of traction motor 14 where the traction motor harmonic level is greater than a desired target level (e.g., a noise, vibration, and harshness (NVH) target level).

The operation of controller 48 in active masking of traction motor harmonics in accordance with the present disclosure will now be explained in greater detail as follows.

A traction motor harmonic frequency $f_h$ is expressed as:

$$f_h = f_m * k_h \quad (1)$$

$f_m$ is the traction motor fundamental mechanical rotation frequency and $k_h$ is the order of the traction motor harmonic (e.g., $k_h=24$ for the $24^{th}$ harmonic, $k_h=48$ for $48^{th}$ harmonic, and $k_h=96$ for the $96^{th}$ harmonic, etc.).

With PWM control being used in the traction motor control, as described above, the frequency $f_k$ of the three-phase line-to-line voltage or phase current is a function of motor speed, as expressed by the following equations (Bimal K. Bose "Modern Power Electronics and AC drives", pg. 213, Prentice Hall PTR 2002):

$$f_k = f_c \pm (2*n)*f_e \quad (2)$$

$$f_k = 2*f_c \pm (2*m-1)*f_e \quad (3)$$

$f_c$ is the PWM control signal carrier switching frequency, f e is the traction motor fundamental electric rotation frequency, and n and m are integers.

The relationship between traction motor electrical and mechanical rotation frequency is:

$$f_e = k_{pp} * f_m \quad (4)$$

$k_{pp}$ is the traction motor pole-pair (e.g., $k_{pp}=4$ for a traction motor having four pole-pairs, $k_{pp}=6$ for a traction motor having six pole-pairs, etc.).

Figure 3:
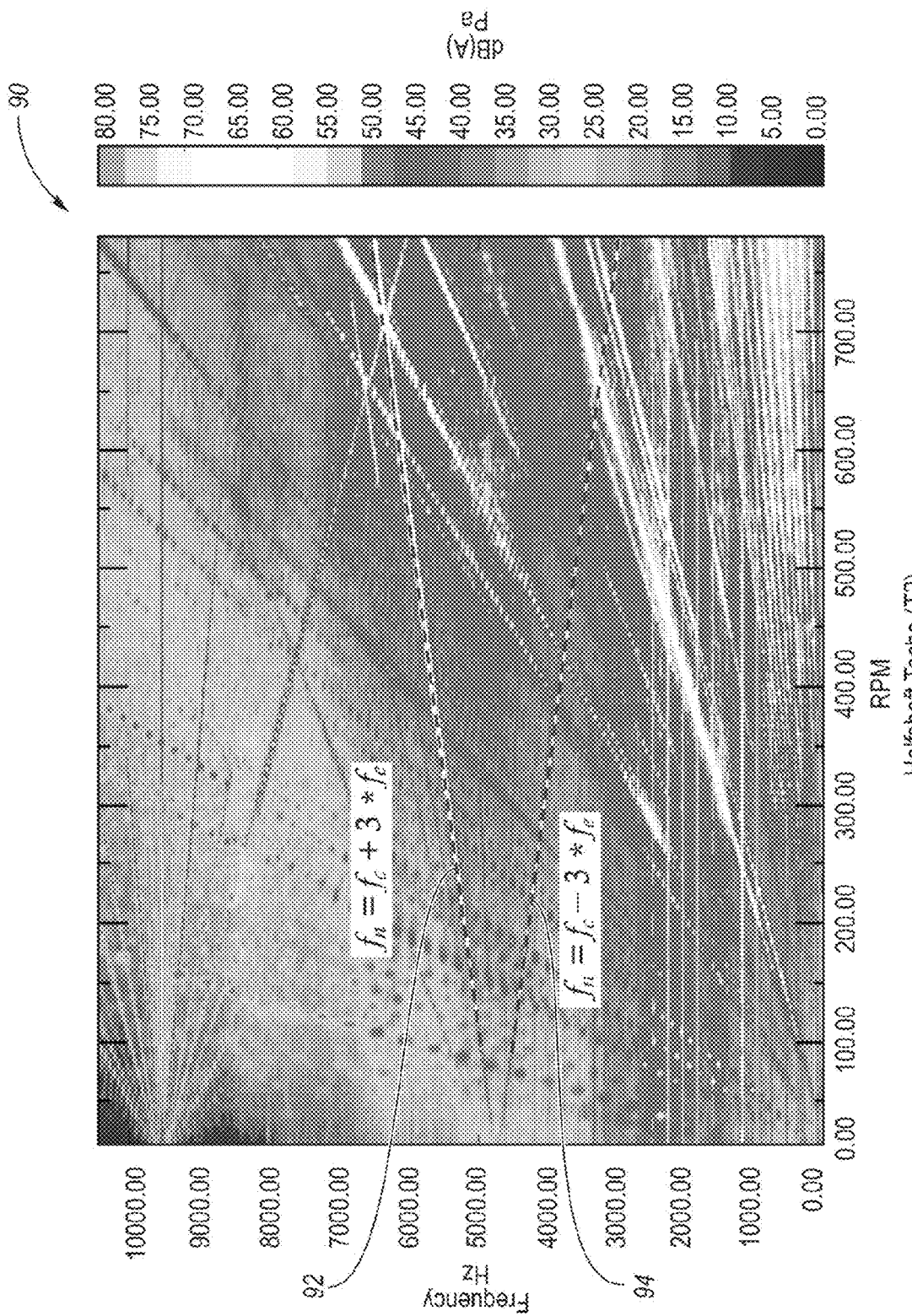
FIG. 3 illustrates a graph depicting switching noise sidebands, emitted from the inverter in operating to drive the traction motor to propel the EV, as a function of inverter switching frequency and traction motor speed.

Referring now to FIG. 3, with continual reference to FIGS. 1 and 2, a graph 90 depicting switching noise, emitted from inverter 26 in operating to drive traction motor 14 to propel EV 12, as a function of switching frequency of the inverter and speed of the traction motor is shown. The information in graph 90 is obtained by using a PWM control signal having a 4750 Hz carrier switching frequency with traction motor 14 having four pole-pairs.

As described, in traction motor 14 and inverter 26 operating to propel EV 12, controller 48 controls the inverter with a PWM control signal for the inverter to drive the traction motor. The PWM control signal has a selected carrier switching frequency. Controlling inverter 26 according to the switching frequency of the PWM control signal generates switching noise, as shown in graph 90 of FIG. 3.

More particularly, the pulsating torque, generated by air gap flux at one frequency interacting with rotor magnetomotive force (MMF) at a different frequency, generates the acoustic noise. The dominant acoustic noise is caused by the interaction between the fundamental air-gap field and the dominant current harmonics, and the switching noise frequency $f_n$ is described by the following equations (X. Sun et al. "Motor Operating Region Based Random Pulse Width Modulation", U.S. Pat. No. 10,538,169):

$$f_n = f_c \pm 3 * f_e \quad (5)$$

$$f_n = 2 * f_c \quad (6)$$

Equation (5) corresponds to two switching noise sidebands of inverter 26. A first one of these two switching noise sidebands is highlighted in graph 90 by dotted lines 92. A second one of these two switching noise sidebands is highlighted in graph 90 by dotted lines 94. Equation (6) corresponds to a third switching noise sideband of inverter 26.

In accordance with the present disclosure, the PWM carrier switching frequency $f_c$ is selected such that a switching noise sideband locates on traction motor harmonics and then the selected PWM carrier switching frequency is modified with a random switching frequency. Consequently, with the use of a PWM control signal having the modified carrier switching frequency, where the modified carrier switching frequency is the carrier switching frequency at which a switching noise sideband frequency $f_n$ matches the harmonic frequency $f_h$, and thereafter adjusted by the random switching frequency, both switching noise and traction motor harmonics noise will be smeared. Hence, the tonal noise spectrum is changed for better hearing performance.

Controller 48 determines the PWM carrier switching frequency $f_c$ at which a switching noise sideband locates on traction motor harmonics by equating $f_h = f_n$ in equations (1) and (5) and equations (1) and (6) to obtain the following equations, respectively:

$$f_c = (k_h \pm 3 * k_{pp}) * f_m \quad (7)$$

$$f_c = k_h / 2 * f_m \quad (8)$$

For example, to mask the traction motor 48th harmonic in a four pole-pair traction motor, controller 48 selects the PWM control carrier switching frequency $f_c$ as $f_c = 60 * f_m$ or $f_c = 36 * f_m$ from equation (7) and then the controller adds proper random dithering to the selected carrier switching frequency $f_c$ to generate a modified carrier switching frequency mod L. Controller 48 thereby controls inverter 26 to drive traction motor 14 according to a PWM control signal having the modified carrier switching frequency mod L.

Another example involves active masking of the traction motor 96th harmonic for a traction motor speed range of 2000 rpm to 3500 rpm. In this example, the traction motor has four pole-pairs. Initially, controller 48 selects the PWM control carrier switching frequency to mask the traction motor 96th harmonic. In this regard, from equation (7), controller 48 selects the PWM carrier switching frequency (i.e., the base carrier switching frequency) as being 3600 Hz at a traction motor speed of 2000 rpm and 6300 Hz at a traction motor speed of 3500 rpm. For a traction motor speed between 2000 rpm and 3500 rpm, controller 48 uses linear interpolation to calculate the PWM carrier switching frequency. Lastly, to smear out the traction motor 96th harmonic, controller 48 adds or subtracts a 750 Hz random switching frequency (i.e., a random switching frequency falling within the random switching frequency range ±750 Hz) to the base carrier switching frequency.

Figure 4:
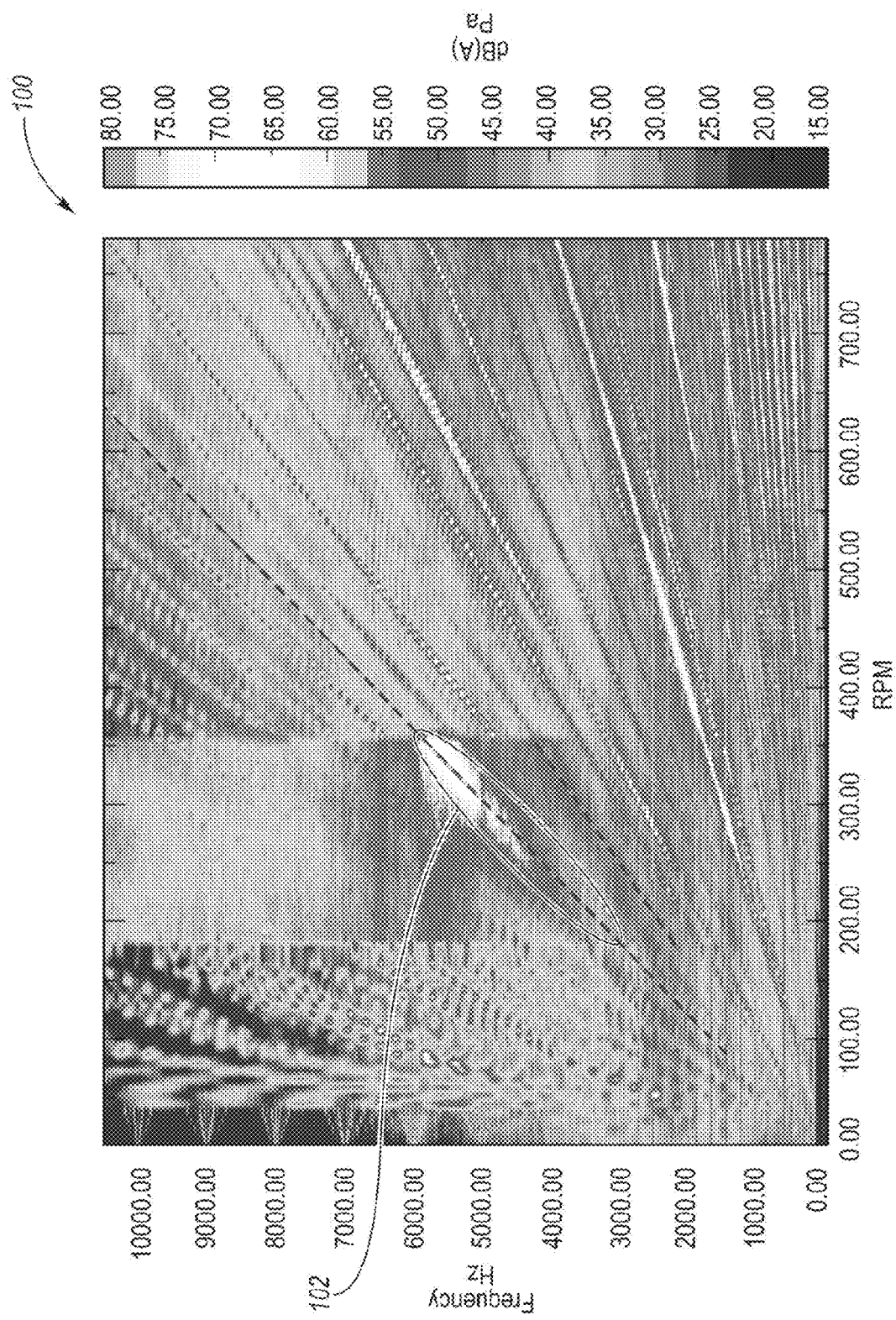
FIG. 4 illustrates a graph depicting the effect on the traction motor harmonic noise by active masking in accordance with the present disclosure.

FIG. 4 illustrates a graph 100 depicting the effect on the 96th traction motor harmonics of using active masking in accordance with the present disclosure. The masked 96th traction motor harmonic is highlighted in circle 102.

As described, the present disclosure proposes active masking motor harmonics using a random switching noise sideband process. According to the proposal, the PWM carrier switching frequency is initially selected such that a switching noise sideband frequency is the same as the motor harmonic frequency, and then proper random frequency is added to the selected PWM carrier switching frequency to smear out the tonal switching noise and harmonics noise.

As described, the present disclosure satisfies the objective of reducing traction motor harmonic noise (also called whine noise) by smearing the whine noise using random switching frequency sideband. This is particularly desirable for a vehicle having resonance which excites traction motor harmonics exceeding a NVH noise target.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
   a traction motor;
   an inverter configured to drive the traction motor with electrical energy from a traction battery; and
   a controller programmed to select a base switching frequency for a control signal for the inverter such that a switching noise sideband frequency of the inverter is the same as a harmonic frequency of the traction motor, modify the selected base switching frequency by a random switching frequency to obtain a modified switching frequency, and control the inverter with the control signal having the modified switching frequency for the inverter to drive the traction motor, wherein the controller is further configured to select the base switching frequency by equating an expression representing the switching noise sideband frequency with an expression representing the harmonic frequency.

2. The system of claim 1 wherein:
   the expression representing the switching noise sideband frequency is $f_c$, where $f_c$ is the base switching frequency, and the expression representing the harmonic frequency is $(k_h \pm 3 * k_{pp}) * f_m$, where $k_h$ is an order of the harmonic frequency of the traction motor, $k_{pp}$ is a number of pole-pairs of the traction motor, and $f_m$ is a fundamental mechanical rotation frequency of the traction motor.

3. The system of claim 1 wherein:
   the expression representing the switching noise sideband frequency is $f_c$, where $f_c$ is the base switching frequency, and the expression representing the harmonic frequency is $k_h / 2 * f_m$, where $k_h$ is an order of the harmonic frequency of the traction motor, and $f_m$ is a fundamental mechanical rotation frequency of the traction motor.

4. The system of claim 1 wherein:
the control signal is a pulse-width-modulated (PWM) control signal.

5. The system of claim 4 wherein:
the inverter includes a plurality of power switches which switch on-and-off according to the modified switching frequency of the PWM control signal for the inverter to be controlled with the control signal.

6. The system of claim 1 wherein:
the random switching frequency varies over time whereby the modified switching frequency of the control signal varies correspondingly.

7. The system of claim 1 wherein:
the random switching frequency falls within a predetermined random switching frequency range which depends on a value of the harmonic frequency.

8. The system of claim 7 wherein:
the predetermined random switching frequency range is a range of ±the value of the harmonic frequency.

9. The system of claim 8 wherein:
the predetermined random switching frequency range is a proper fraction of the range of ±the value of the harmonic frequency.

10. A method comprising:
selecting a base switching frequency for a control signal of a power electronics module such that a switching noise sideband frequency of the power electronics module is the same as a harmonic frequency of a motor, wherein selecting the base switching frequency includes equating an expression representing the switching noise sideband frequency with an expression representing the harmonic frequency;
modifying the selected base switching frequency by a random switching frequency to obtain a modified switching frequency; and
controlling the power electronics module with the control signal having the modified switching frequency for the power electronics module to drive the motor.

11. The method of claim 10 wherein:
the control signal is a pulse-width-modulated (PWM) control signal.

12. The method of claim 10 wherein:
the random switching frequency varies over time whereby the modified switching frequency of the control signal varies correspondingly.

13. The method of claim 10 wherein:
the power electronics module is an inverter.

14. The method of claim 10 wherein:
the motor is a traction motor.

15. An automotive control system for use with an inverter configured to drive a traction motor with electrical energy from a traction battery, the automotive control system comprising:
a controller programmed to select a base switching frequency for a control signal for the inverter such that a switching noise sideband frequency of the inverter is the same as a harmonic frequency of the traction motor, modify the selected base switching frequency by a random switching frequency to obtain a modified switching frequency, and control the inverter with the control signal having the modified switching frequency for the inverter to drive the traction motor, wherein the controller is further configured to select the base switching frequency by equating an expression representing the switching noise sideband frequency with an expression representing the harmonic frequency.

16. The automotive control system of claim 15 wherein:
the control signal is a pulse-width-modulated (PWM) control signal.

17. The automotive control system of claim 16 wherein:
the inverter includes a plurality of power switches which switch on-and-off according to the modified switching frequency of the PWM control signal for the inverter to be controlled with the control signal.

18. The automotive control system of claim 15 wherein:
the expression representing the switching noise sideband frequency is $f_c$, where $f_c$ is the base switching frequency, and the expression representing the harmonic frequency is $(k_h \pm 3*k_{pp})*f_m$, where $k_h$ is an order of the harmonic frequency of the traction motor, $k_{pp}$ is a number of pole-pairs of the traction motor, and $f_m$ is a fundamental mechanical rotation frequency of the traction motor.

19. The automotive control system of claim 15 wherein:
the expression representing the switching noise sideband frequency is $f_c$, where $f_c$ is the base switching frequency, and the expression representing the harmonic frequency is $k_h/2*f_m$, where $k_h$ is an order of the harmonic frequency of the traction motor, and $f_m$ is a fundamental mechanical rotation frequency of the traction motor.

* * * * *